US012148990B2

(12) United States Patent
Ji et al.

(10) Patent No.: US 12,148,990 B2
(45) Date of Patent: Nov. 19, 2024

(54) ANTENNA DEVICE

(71) Applicant: KMW INC., Hwaseong-si (KR)

(72) Inventors: Kyo Sung Ji, Hwaseong-si (KR); Bae Mook Jeong, Suwon-si (KR); Joung Hoe Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 82 days.

(21) Appl. No.: 17/994,021

(22) Filed: Nov. 25, 2022

(65) Prior Publication Data

US 2023/0087435 A1 Mar. 23, 2023

Related U.S. Application Data

(63) Continuation of application No. PCT/KR2021/006522, filed on May 26, 2021.

(30) Foreign Application Priority Data

May 26, 2020 (KR) ........................ 10-2020-0063209
May 25, 2021 (KR) ........................ 10-2021-0066752

(51) Int. Cl.
*H01Q 1/52* (2006.01)
*H01Q 1/02* (2006.01)
(Continued)

(52) U.S. Cl.
CPC ............... *H01Q 1/526* (2013.01); *H01Q 1/02* (2013.01); *H01Q 1/246* (2013.01); *H01Q 21/0025* (2013.01); *H01Q 21/062* (2013.01)

(58) Field of Classification Search
CPC ............ H01Q 1/02; H01Q 1/246; H01Q 1/52; H01Q 1/526; H01Q 21/0025; H01Q 21/062
See application file for complete search history.

(56) References Cited

U.S. PATENT DOCUMENTS 6,048,212 A 4/2000 Stauble et al.
2018/0316086 A1 11/2018 Lehman et al.
(Continued)

FOREIGN PATENT DOCUMENTS

CN 206673115 U 11/2017
JP 2001-313581 A 11/2001
(Continued)

OTHER PUBLICATIONS

International Search Report mailed Aug. 30, 2021 for International Application No. PCT/KR2021/00006522 and its English translation.

(Continued)

*Primary Examiner* — Robert Karacsony
(74) *Attorney, Agent, or Firm* — Insight Law Group, PLLC; Seung Lee

(57) ABSTRACT

The present invention relates to an antenna device, and especially, comprises: a printed board assembly (PBA hereinafter) which has a plurality of antenna-related components mounted to one surface, and has a plurality of filters mounted to the other surface; and an antenna board which is stacked and disposed on the one surface side of the PBA, has a plurality of antenna elements mounted to one surface, and is connected to the filters tightly adhering to the other surface, so as to establish an electrical signal line with the filters, wherein the filters are spaced apart from the other surface of the PBA and have clamshell parts integrally formed so as to prevent a signal leakage from the electrical signal line, and thus an advantage is provided of enabling the improvement of the overall heat dissipation performance and filter performance of the filters.

13 Claims, 15 Drawing Sheets

(51) Int. Cl.

| | |
|---|---|
| ***H01Q 1/24*** | (2006.01) |
| ***H01Q 21/00*** | (2006.01) |
| ***H01Q 21/06*** | (2006.01) |

(56) References Cited

U.S. PATENT DOCUMENTS

| | | | | |
|---|---|---|---|---|
| 2019/0268046 | A1* | 8/2019 | Kim | H01Q 21/0006 |
| 2020/0313285 | A1* | 10/2020 | Chu | H01Q 15/246 |
| 2023/0111873 | A1* | 4/2023 | Kum | H01Q 1/246<br>343/893 |

FOREIGN PATENT DOCUMENTS

| | | | |
|---|---|---|---|
| JP | 2019-536362 | A | 12/2019 |
| KR | 10-2014-0126204 | A | 10/2014 |
| KR | 10-2018-0118356 | A | 10/2018 |
| KR | 10-2019-0118979 | A | 10/2019 |
| KR | 10-2019-0126336 | A | 11/2019 |
| KR | 10-2020-0049620 | A | 5/2020 |
| WO | 2019/047091 | A1 | 3/2019 |
| WO | 2019/240489 | A1 | 12/2019 |
| WO | 2020/091329 | A1 | 5/2020 |

OTHER PUBLICATIONS

Notice of Allowance mailed May 30, 2022 from the Korean Intellectual Property Office for Korean Application No. 10-2021-0066752.

Non-final Office Action mailed on Jan. 23, 2024 from the Japanese Patent Office for Japanese Application No. 2022-572319.

Extended European Search Report mailed on May 13, 2024 from the European Patent Office for European Application No. 21813679.4.

* cited by examiner

Prior Art

*Prior Art*

ANTENNA DEVICE

CROSS-REFERENCE TO RELATED APPLICATIONS

This application is a continuation application of International Application No. PCT/KR2021/006522, filed May 26, 2021, which claims the benefit of Korean Patent Application Nos. 10-2020-0063209, filed May 26, 2020; and 10-2021-0066752, filed May 25, 2021, in the Korean Intellectual Property Office, the disclosures of which are incorporated herein in their entirety by reference.

TECHNICAL FIELD

The present disclosure relates to an antenna device, and more particularly, to an antenna device which can improve heat dissipation performance and facilitate an assembly thereof.

BACKGROUND ART

A wireless communication technology, for example, a multiple-input multiple-output (MIMO) technology is a technology which can dramatically increase data transmission capacity by using a plurality of antennas, and in this technology, a transmitter transmits different data through respective transmission antennas, and a receiver adopts a spatial multiplexing technique to separate pieces of transmitted data through proper signal processing.

Accordingly, with the simultaneous increase of the number of transmission/reception antennas, the channel capacity is increased, and thus more data can be transmitted. For example, in case that the number of antennas is increased to 10, about 10 times channel capacity can be secured by using the same frequency band as compared with the current single antenna system. In case of a transmission/reception device to which such a MIMO technology is applied, the number of transmitters and filters can also be increased as the number of antennas is increased.

FIG. 1 is an exploded perspective view and a partial enlarged view of a plurality of layers of a MIMO antenna device in the related art, and FIG. 2 is a perspective view and a partial cross-sectional view illustrating a filter assembly between a related PCB board and an antenna substrate among constitutions of FIG. 1.

Referring to FIGS. 1 and 2, an example of a MIMO antenna device in the related art includes a main housing 10 having one side being opened and provided with a specific installation space and the other side being shielded and integrally formed with a plurality of heat dissipation pins.

In addition, the example of the MIMO antenna device in the related art further includes a print board assembly (hereinafter, abbreviated to "PBA") 30 primarily stacked to come in close contact with one surface (lower surface in the drawing) of a bottom surface of an installation space of the main housing 10, and having the other surface on which RF feeder network related components (not illustrated) are mounted and one surface on which a plurality of filters 40 are mounted to interpose clamshells 50 between the filters, and an antenna board 60 secondarily stacked inside the installation space of the main housing 10, and having the other surface connected to construct specific electrical signal lines via an RF connector 43 of the filters 40 of the PBA 30 and one surface on which a plurality of antenna elements 65 are mounted.

Here, the filter 40 may be adopted as any one of a cavity filter, a waveguide filter, and a dielectric filter. In addition, the filter 40 does not exclude a multi-band filter (MBF) that covers a multi-frequency band.

Further, the clamshell 50 is interposed between the PBA 30 and the filter 40 and performs a signal shielding function by shielding electromagnetic waves generated from electrical components (e.g., RF feeder network related components (not illustrated)) mounted on the PBA 30 so as not to exert an influence on the electrical signal line constructed in the filter 40.

However, on the point that one surface of the PBA 30 on which a plurality of RF feeder network components are mounted and the filter 40 should be provided to energize each other, as being referenced in FIG. 1, at least one case extension part 45, into which an RF connector 43 is inserted, may be provided on the filter 40, and at least one through-hole 55 that is penetrated by the case extension part 45 may be formed on the clamshell 50.

However, the MIMO antenna device in the related art is manufactured in a state where the thickness of the main housing 10 is minimized due to the slimming trend of the product, and accordingly, internal components (e.g., resonance component (not illustrated) of the filter 40 are arranged in one row in a horizontal direction, so that an internal space in a cavity is narrowed, and thus the skirt characteristic (i.e., Q value) is reduced.

Further, the filter 40 is a representative heat generation element that generate a large amount of heat in a frequency filtering process, and the heat generated from the filter 40 is transferred to one surface side of the PBA 30 via the clamshell 50 or through the clamshell 50, and then is dissipated through the plurality of heat dissipation pins 15 in order to improve the filter performance of the filter 40.

However, there is a problem in that the thermal conductivity is reduced by thermal contact resistance of the clamshell 50 separately provided between the filter 40 and the PBA 30, and the filter performance of the filter 40 is degraded due to the degrading of the heat dissipation performance.

DISCLOSURE

Technical Problem

In order to solve the above problems, an aspect of the present disclosure is to provide an antenna device which can maximize the heat dissipation performance by minimizing the thermal contact resistance through integral forming of a filter and a clamshell.

Another aspect of the present disclosure is to provide an antenna device which can increase the skirt characteristic (i.e., Q value) and minimize heat generation by maximally securing a separation distance of built-in components inside a filter.

The technical problems of the present disclosure are not limited to the above-described technical problems, and other unmentioned technical problems may be clearly understood by those skilled in the art from the following descriptions.

Technical Solution

In one embodiment of the present disclosure, an antenna device includes: a printed board assembly (hereinafter, abbreviated to "PBA") having one surface on which a plurality of antenna-related components are mounted and the other surface on which a plurality of filters are mounted; and an antenna board disposed to be stacked on one surface side of the PBA, mounted with a plurality of antenna elements on one surface of the antenna board, and connected to construct electrical signal lines with the filters in close contact with the other surface of the antenna board, wherein the filter is spaced apart from the other surface of the PBA, and is integrally formed with a clamshell part configured to prevent a signal from leaking from the electrical signal lines.

Here, a clamshell seating groove, into which an end part of the clamshell part is inserted, may be formed on the other surface of the PBA through intaglio processing in a groove shape.

Further, a heat transfer bridge hole (via hole) for transferring heat transferred from the clamshell part toward one surface side may be formed on the PBA.

Further, a thermal conductive material may be plated and formed on the clamshell seating groove, the heat transfer bridge hole, and the one surface of the PBA.

Further, the heat transfer bridge hole may be formed in a plurality of places of the clamshell seating groove.

Further, the clamshell seating groove may be formed in a shape corresponding to a shape of an end part of the clamshell part so that all end parts of the clamshell part come in contact with the clamshell seating groove.

Further, the filter may be provided in a manner that at least one cavity is separately provided by a partition, and at least two resonance components provided to project from the partition into the cavity is disposed to be stacked so as to form different layers to the PBA side and the antenna board side.

Further, the filter may include: two filter main bodies formed left and right around the partition; and a left shielding panel configured to shield an open left side of the cavity and a right shielding panel configured to shield an open right side of the cavity, wherein the clamshell part extends from one end part of the filter main body and is mounted on the other surface of the PBA.

Further, the filter may further include at least one RF connector connected to one surface of the antenna board.

Further, a heat transfer for transferring heat transferred from the clamshell part to one surface side may be formed on the PBA, a thermo-fluidic hole may be further formed on one end part and the other part of a length direction of the filter main body to penetrate the filter main body, and the thermo-fluidic hole may be formed to match the heat transfer bridge hole.

Further, at least two partitioned hollow parts may be formed in the clamshell part, a signal input line for inputting a signal toward a cavity of the filter may be provided in one of the hollow parts, and a signal output line for outputting a signal from the cavity side of the filter may be provided in the other of the hollow parts.

Advantageous Effects

The antenna device according to an embodiment of the present disclosure can achieve various effects as follows.

First, by integrally providing the filter and the clamshell part, the heat dissipation performance can be improved through minimization of the thermal contact resistance.

Second, since the installation location of the clamshell part integrally formed with the filter on the other surface of the print board assembly can be easily grasped, the assembly time can be reduced.

Third, by stacking and providing a notch bar inside the filter, the Q value is improved, and the amount of heat generation is minimize to improve the filter performance of the filter.

The effects of the present disclosure are not limited to the above-described effects, and other unmentioned effects can be clearly understood by those skilled in the art from the appended claims.

EXPLANATION OF SYMBOLS

Figure 1:
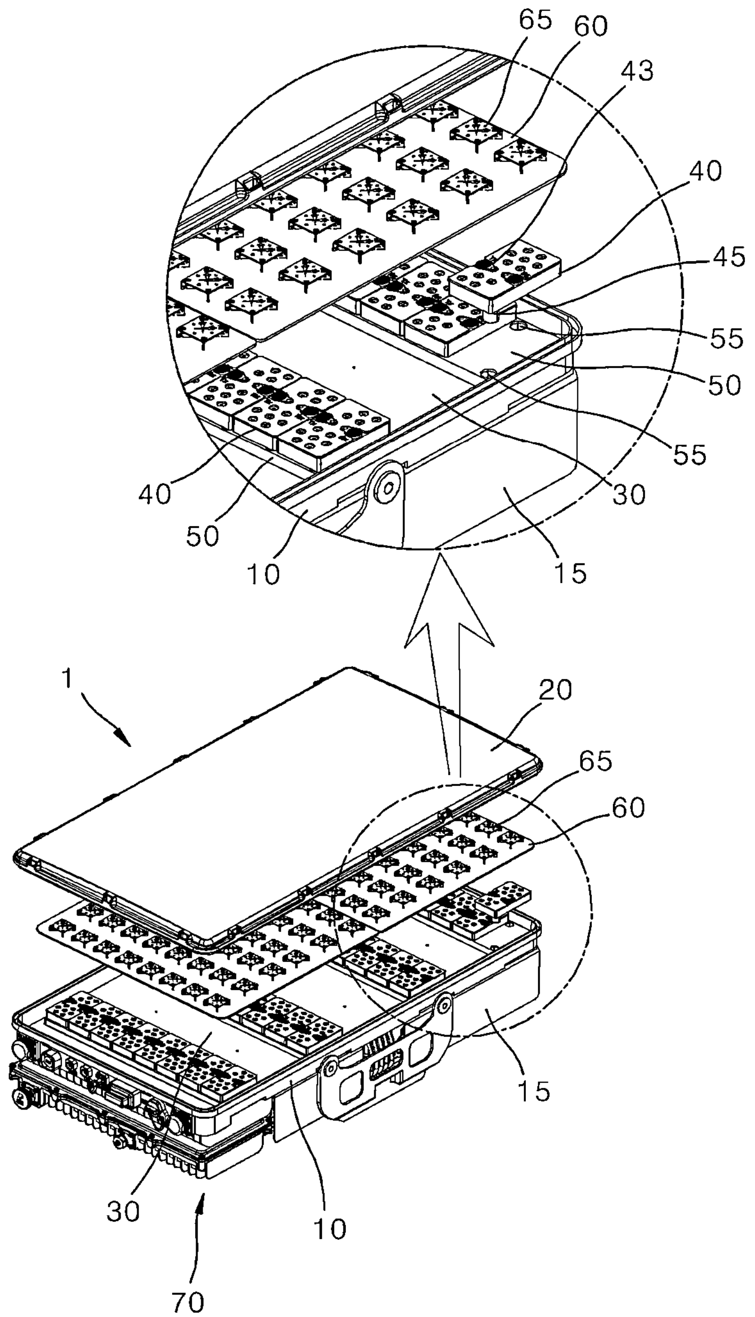
FIG. 1 is an exploded perspective view and a partial enlarged view illustrating a plurality of layers of a MIMO antenna device in the related art.

10: main housing 15: a plurality of heat dissipation pins
130: printed board assembly (PBA) 131: clamshell seating groove
133: heat transfer bridge hole 160A, 160B: antenna board
200: filter 210: filter main body
220A: right shielding panel 220B: left shielding panel
233: cavity 240: clamshell part

MODE FOR INVENTION

Hereinafter, an antenna device according to an embodiment of the present disclosure will be described in detail with reference to the exemplary drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known constitutions or functions will be omitted if it is determined that the detailed explanation interferes with understanding of the embodiments of the present disclosure.

The terms, such as “first, second, A, B, (a), and (b)”, may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

Figure 3:
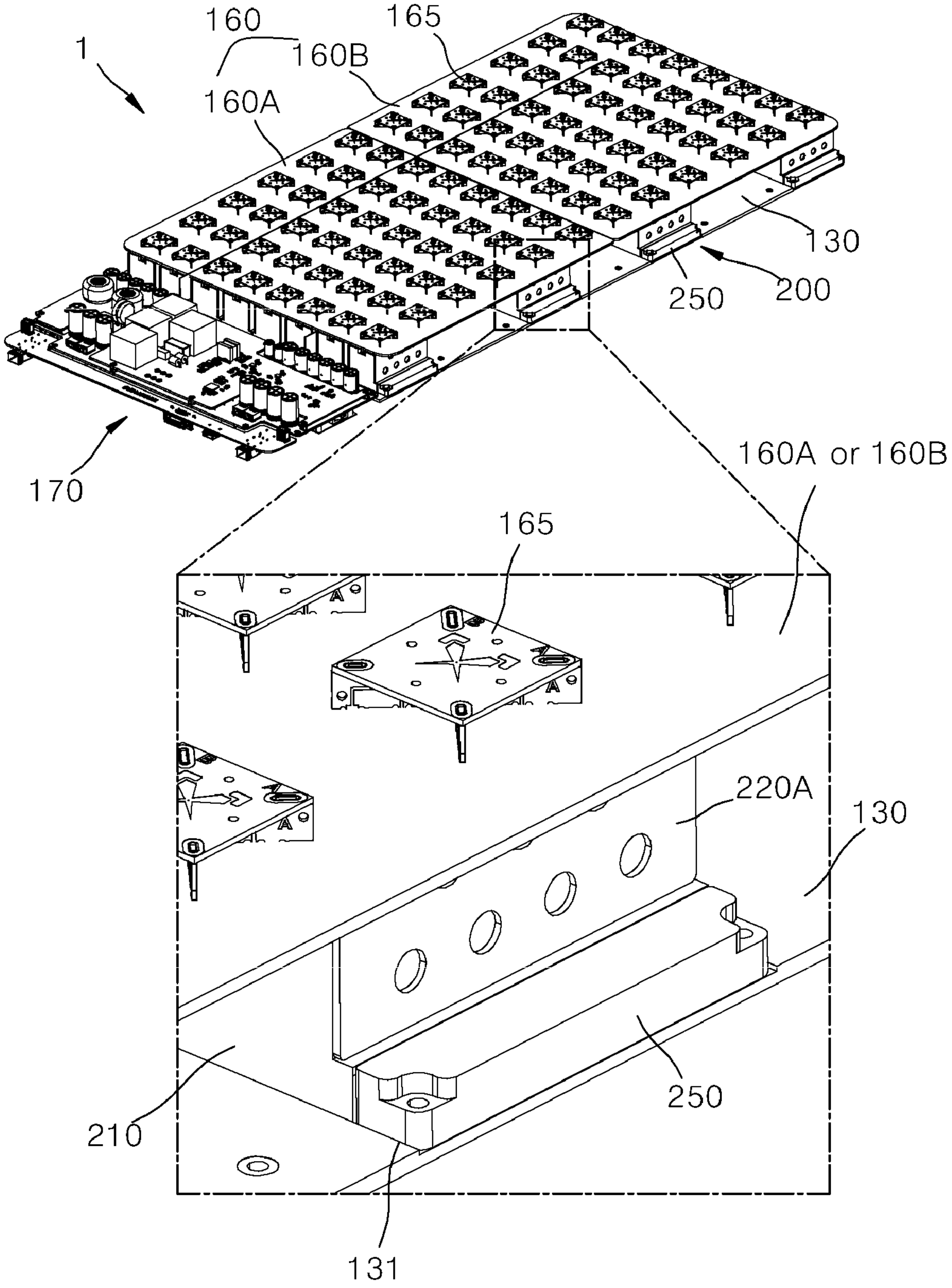
FIG. 3 is a perspective view and a partial enlarged view illustrating a stacked appearance of a PBA and an antenna board of an antenna device according to an embodiment of the present disclosure.

FIG. 3 is a perspective view and a partial enlarged view illustrating a stacked appearance of a PBA and an antenna board of an antenna device according to an embodiment of the present disclosure.

An antenna device 1 according to an embodiment of the present disclosure includes a printed board assembly (hereinafter, abbreviated to “PBA”) 130 primarily stacked on an inside of an accommodation space of a main housing (refer to reference numeral 10 of FIG. 1) that forms the accommodation space open toward the front (upward in the drawing) and is in a cuboid shape having thin front and rear accommodation width elongated substantially in upward and downward directions, and at least one antenna board 160 disposed to be secondarily stacked to be spaced apart from the front (upward in the drawing) of the PBA 130.

Here, as illustrated in FIG. 3, the antenna board 160 may be provided to be separated into a lower antenna substrate 160A provided on a relatively lower side (left side in the drawing) and an upper antenna substrate 160B provided on a relatively upper side (right side in the drawing). However, it is not always necessary that the antenna board 160 is provided to be separated into the lower antenna substrate 160A and the upper antenna substrate 160B, but it is also possible that a single antenna board 160 is provided.

Referring to FIG. 3, a plurality of RF feeder network related components (refer to reference numeral 140 of FIG. 6B) may be mounted on one surface (lower surface in the drawing) of the PBA 130, and a plurality of filters 200 may be mounted on the other surface (upper surface in the drawing) of the PBA.

Here, the filter 200 may be adopted as any one of a cavity filter, a waveguide filter, and a dielectric filter. In addition, the filter 200 does not exclude a multi-band filter (MBF) that covers a multi-frequency band.

More specifically, as illustrated in FIG. 3, the plurality of filters 200 may be disposed to be in a long row in left and right directions on the other surface of the PBA 130. Here, the filters 200 may be disposed in four rows. The respective rows of the filters 200 may be disposed to be spaced apart from each other in upward and downward directions.

Here, as illustrated in FIG. 3, in case that the antenna board 160 is provided to be separated into the lower antenna substrate 160A and the upper antenna substrate 160B, two rows of filters 200 may be provided to be spaced apart from each other in the upward and downward directions on the rear surface side of the lower antenna substrate 160A, and two rows of filters 200 may be provided to be spaced apart from each other in the upward and downward directions on the rear surface side of the upper antenna substrate 160B. In this case, the separation distances in the upward and downward directions between the filters 200 of the respective rows may be set to be equal to each other.

As illustrated in FIG. 3, the filters 200 provided on the rightmost and leftmost sides of respective rows among the plurality of filters 200 may be installed and supported by side supporters 250 provided with the same material as the material of the clamshell part 240 to be described later.

As illustrated in FIG. 3, the side supporters 250 may support the installation of the filters 200 provided on the rightmost and leftmost sides of the respective rows, and at the same time, may perform partially the same function as the function of the clamshell part 240 by shielding the open side surface of the clamshell part 240 integrally formed with the corresponding filters 200.

If a power is applied from a power supply unit assembly (hereinafter, abbreviated to “PSU assembly”) 70 provided on one side, the PBA 130 may serve to control the power to be input to the side of the filters 200 or to be output from the side of the filters 200 in order to perform calibration feeder control and frequency filtering of a plurality of RF feeder network related components 140.

Since it is expected that the plurality of RF feeder network related components 140 generate significant heat when the power is driven, although not illustrated in the drawing, they may be provided to directly come in thermal contact with the bottom surface (the other surface) of the accommodation space of the main housing 10. The heat transferred to the main housing 10 can be easily dissipated to an external space (preferably, rear space) through a plurality of heat dissipation pins (refer to reference numeral 15 of FIG. 1) that are integrally formed on outer surface (one surface) of the main housing 10.

Meanwhile, as illustrated in FIG. 3, the filter 200 is a filtering device disposed between the PBA 130 and the antenna boards 160A and 160B and configured to perform frequency filtering, and may perform the frequency filtering through specific electrical signal lines constructed between the PBA 130 and the antenna boards 160A and 160B.

Figure 4:
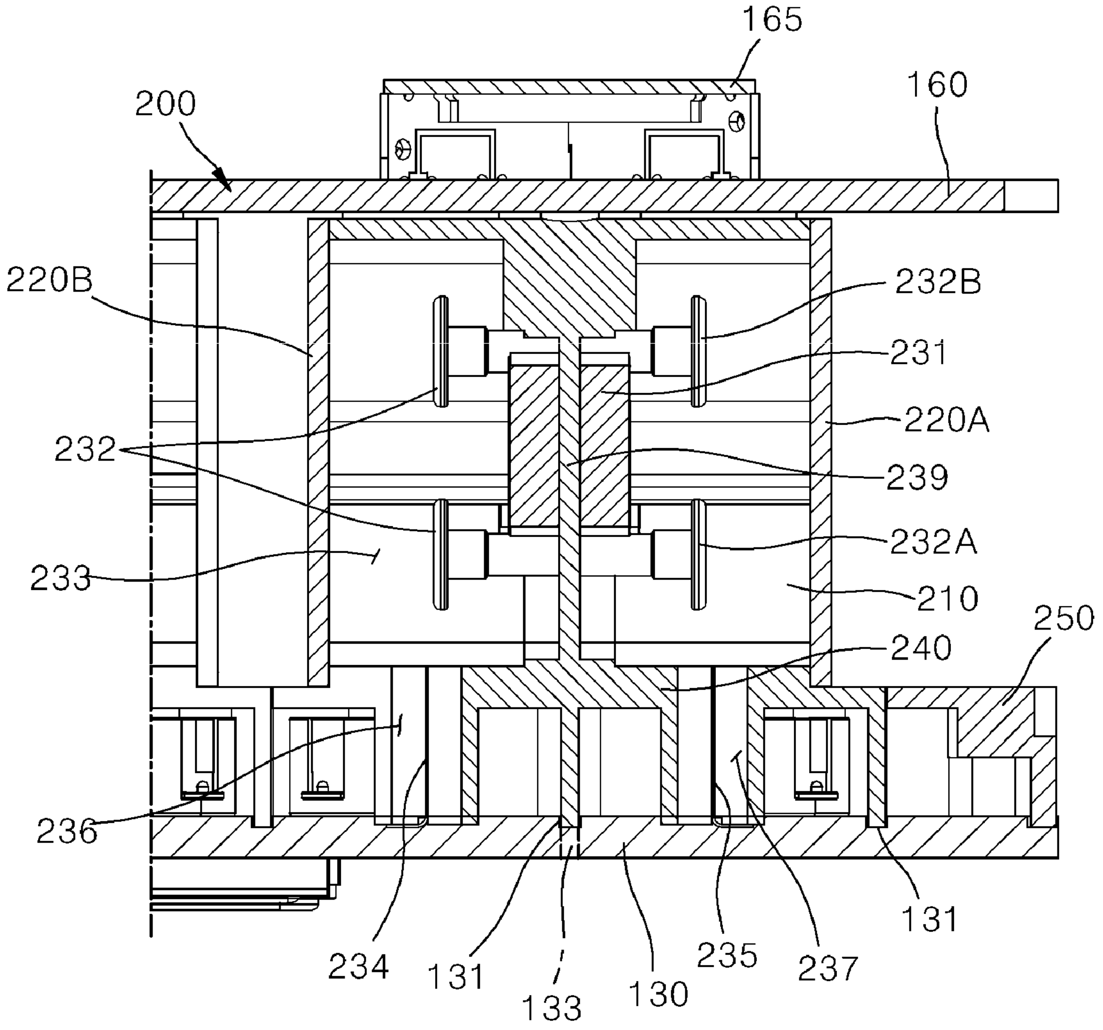
FIG. 4 is a cross-section view illustrating an internal appearance of a filter.
Figure 5:
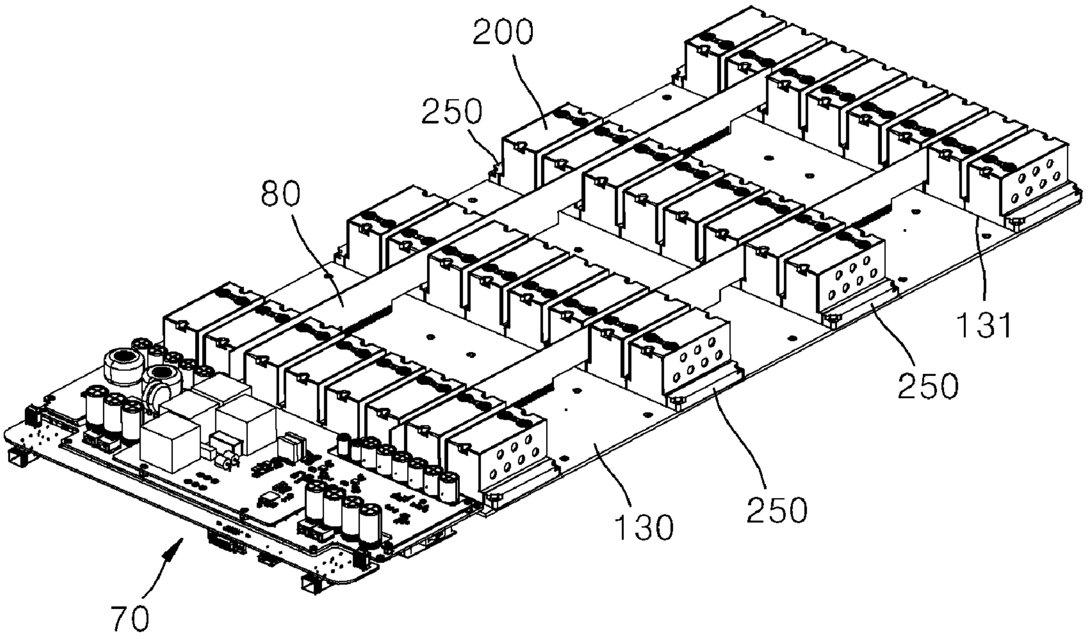
FIG. 5 is a perspective view illustrating filters and a PSU assembly stacked on one surface of a PBA.

FIG. 4 is a cross-section view illustrating an internal appearance of a filter, and FIG. 5 is a perspective view illustrating filters and a PSU assembly stacked on one surface of a PBA.

First, the detailed constitutions of the filter 200 will be described in detail as follows. As illustrated in FIG. 4, the filter 200 may include a filter main body 210 in which at least one cavity 233 is separated into a left cavity 233A and a right cavity 233B by a partition 239 that crosses the center of the cavity, and at least two resonance components 232 provided to project from the partition 239 into the left cavity 233A and the right cavity 233B. The resonance component 232 serves to be tuned to a frequency band desired by a designer through tolerance adjustment with a frequency tuning screw (not illustrated). For reference, a plurality of frequency tuning screws may be provided to cover the left cavity 233A, and may be provided on a left filter tuning cover (not illustrated) provided between left shielding panels 220B to be described later and on a right filter tuning cover (not illustrated) provided between right shielding panels 220A to be described later.

Here, the filter 200 may further include the left shielding panel 220B configured to shield the open left side as the cavity (left cavity 233A) formed on the left side among the cavities 233 of the filter main body 210.

In order to shield an external noise (signal caused by electromagnetic waves) against the cavity 233 formed by the filter 200, the filter main body 210 may be provided so that inner sides (e.g., inner side surfaces forming the left cavity 233A and the right cavity 233B) are plated in the form of a metal thin film, and inner side surfaces of the left shielding panel 220B and the right shielding panel 220A are plated in the form of a metal thin film in the same manner.

It is preferable that the resonance component 232 provided inside the filter main body 210 is provided not to come in direct contact with the filter main body 210 made of a conductive material via a resonance part supporter 231 provided of a nonconductive material.

Figure 9:
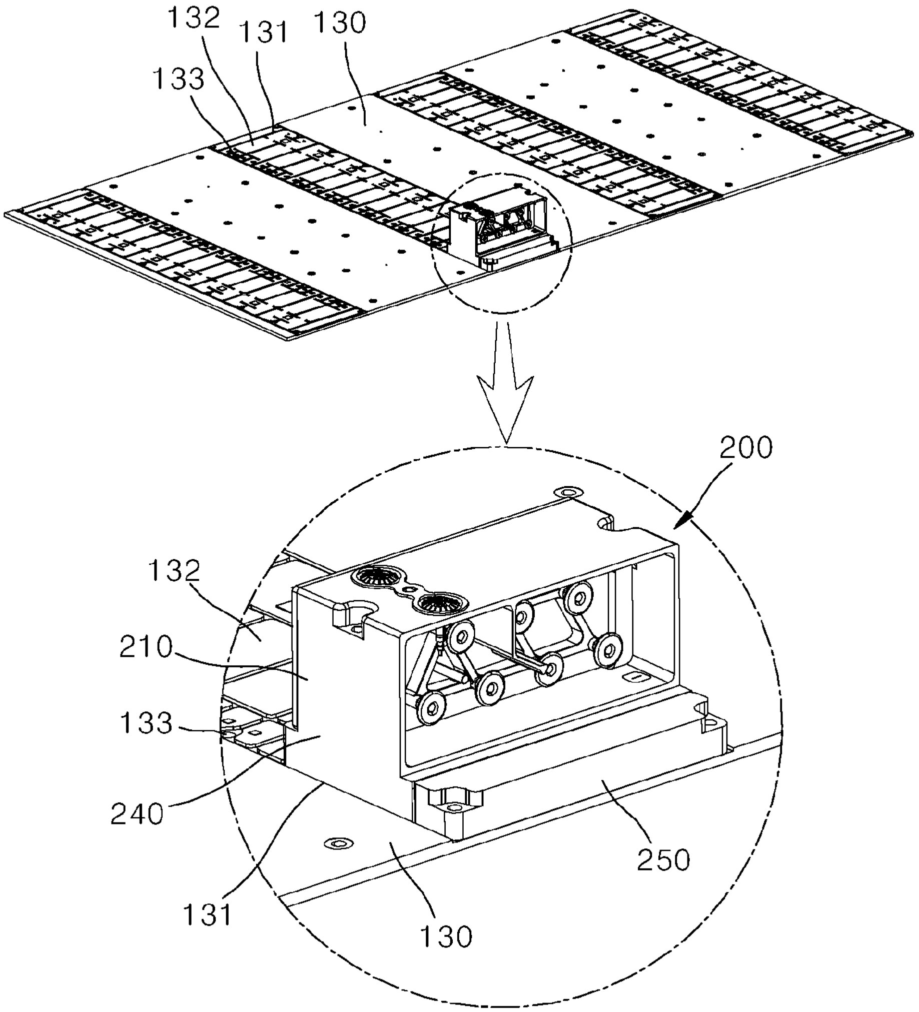
FIG. 9 is a perspective view and a partial enlarged view illustrating a stacked appearance of a filter and a side support for a location setting groove formed on one surface of the PBA of FIG. 7.

Meanwhile, a plurality of resonance components 232 (for reference, in the present embodiment, seven resonance components as illustrated in FIG. 9) may be disposed side by side in a length direction (horizontal direction in the drawing) of the filter main body 210. Here, among the plurality of resonance components 232, first resonance component groups 232A may be disposed to be spaced apart from each other to form one layer that is adjacent to the PBA 130, and in addition, second resonance component groups 232B may be stacked and disposed to be spaced apart from each other, being adjacent to the antenna board 160B to form different layers from the first resonance component groups 232A.

Such a disposition design of the resonance components 232 in the cavity 233 of the filter main body 210 is different from that in the related art on the point that the resonance components are stacked and disposed while forming two layers in the filter main body 210 so as to maximally secure the separation distance between the respective resonance components 232 and to maximally secure the separation distance between the inner surface of the filter main body 210 or the left shielding panel 220B and the right shielding panel 220A.

Accordingly, in the cavity 233 of the filter main body 210, the skirt characteristic (e.g., Q value) is increased, and an insertion loss is reduced, so that the amount of heat generation in the cavity 233 is greatly reduced. The reduction of the amount of heat generation of the filter 200 may follow the improvement of the filter performance.

In addition, as illustrated in FIGS. 4 and 5, in the filter 200, the filter main body 210 may be integrally formed with the clamshell part 240 which separates the filter main body 210 from the other surface of the PBA 130 and is configured to prevent the signal leakage from the electrical signal lines.

The clamshell part 240 has an integral constitution located between the filter main body 210 of the filter 200 and the other surface of the PBA 130, and serves to secure reliability of the filtering performance by blocking the influence of the electromagnetic waves exerted from the electrical components (e.g., including RF feeder network component 140) mounted on the PBA 130. Here, the clamshell part 240 may be a shield cover that shields the signal.

Figure 2:
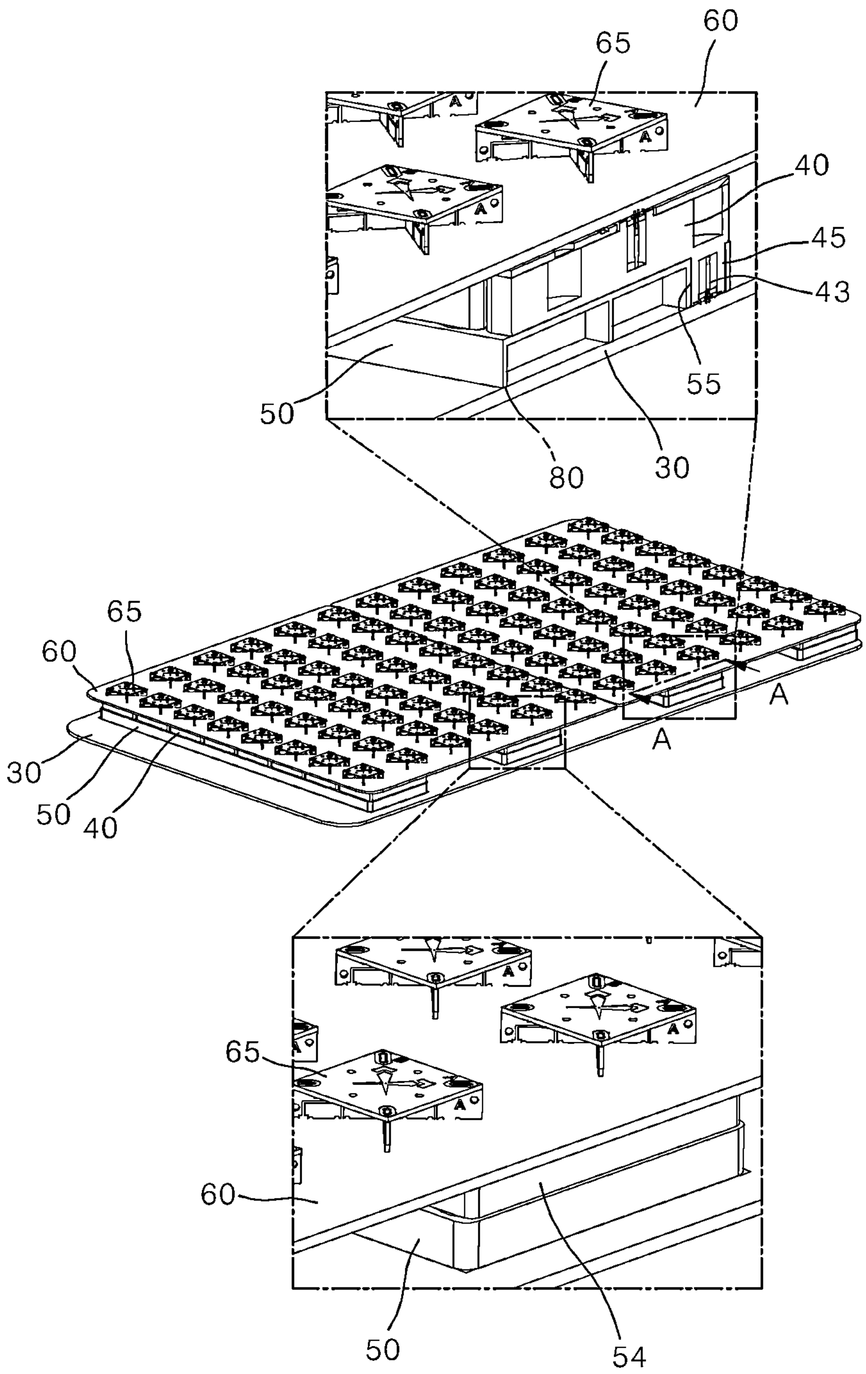
FIG. 2 is a perspective view and a partial cross-sectional view illustrating a filter assembly between a related PCB board and an antenna substrate among the constitutions of FIG. 1.

In distinction from the antenna device in the related art as illustrated in FIGS. 1 and 2, the clamshell part 240 may be integrally injection-molded with the filter main body 210. Here, in the same manner as the above-described filter 200, a material that facilitates the blocking of the electromagnetic waves may be coated or plated on the outer surface or the inner surface of the clamshell part 240.

Further, as illustrated in FIG. 4, at least two partitioned hollow parts 236 and 237 may be formed in the clamshell part 240, a signal input line 234 for inputting a signal toward the cavity 233 of the filter main body 210 of the filter 200 may be provided in any one 236 of the hollow parts 236 and 237, and a signal output line 235 for outputting a signal from the side of the cavity 233 of the filter main body 210 of the filter 200 may be provided in the other 237 of the hollow parts 236 and 237.

The signal input line 234 and the signal output line 235 may be provided in the form of a plate of a conductive material, and one bent end part thereof may be mounted or contacted on the other surface of the PBA 130, and the other end part thereof may be energized with the cavity 233 of the filter main body 210.

As illustrated in FIG. 5, the power that is supplied from the PSU assembly 70 may be branched through at least one power line 80 disposed to cross between the plurality of filters 200 and pin-coupled to the other surface of the PBA 130. The power line 80 may be pin-coupled to a plurality of places on one surface of the PBA 130.

Figure 6A:
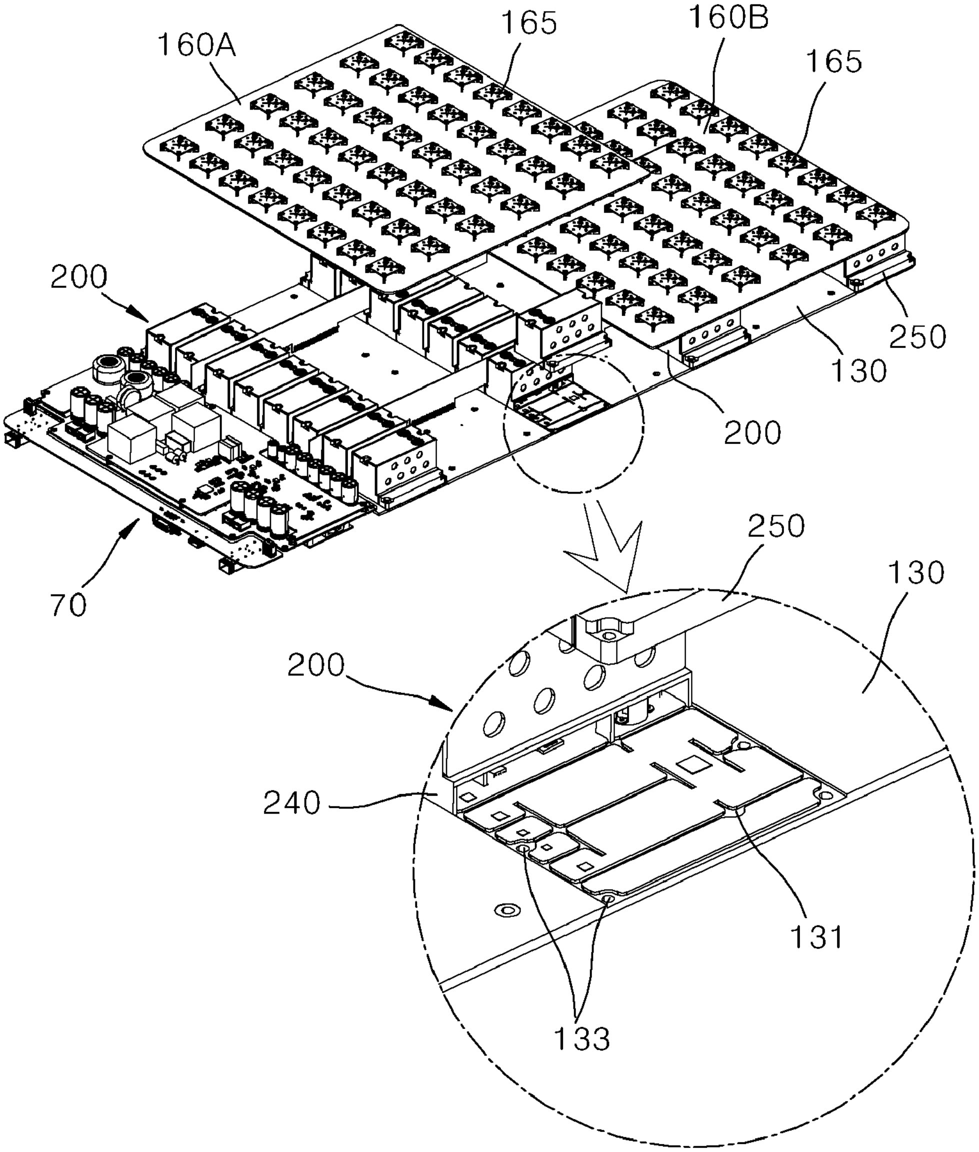
FIGS. 6A and 6B are partial exploded perspective views of FIG. 3, and are downward and upward exploded perspective views.
Figure 6B:
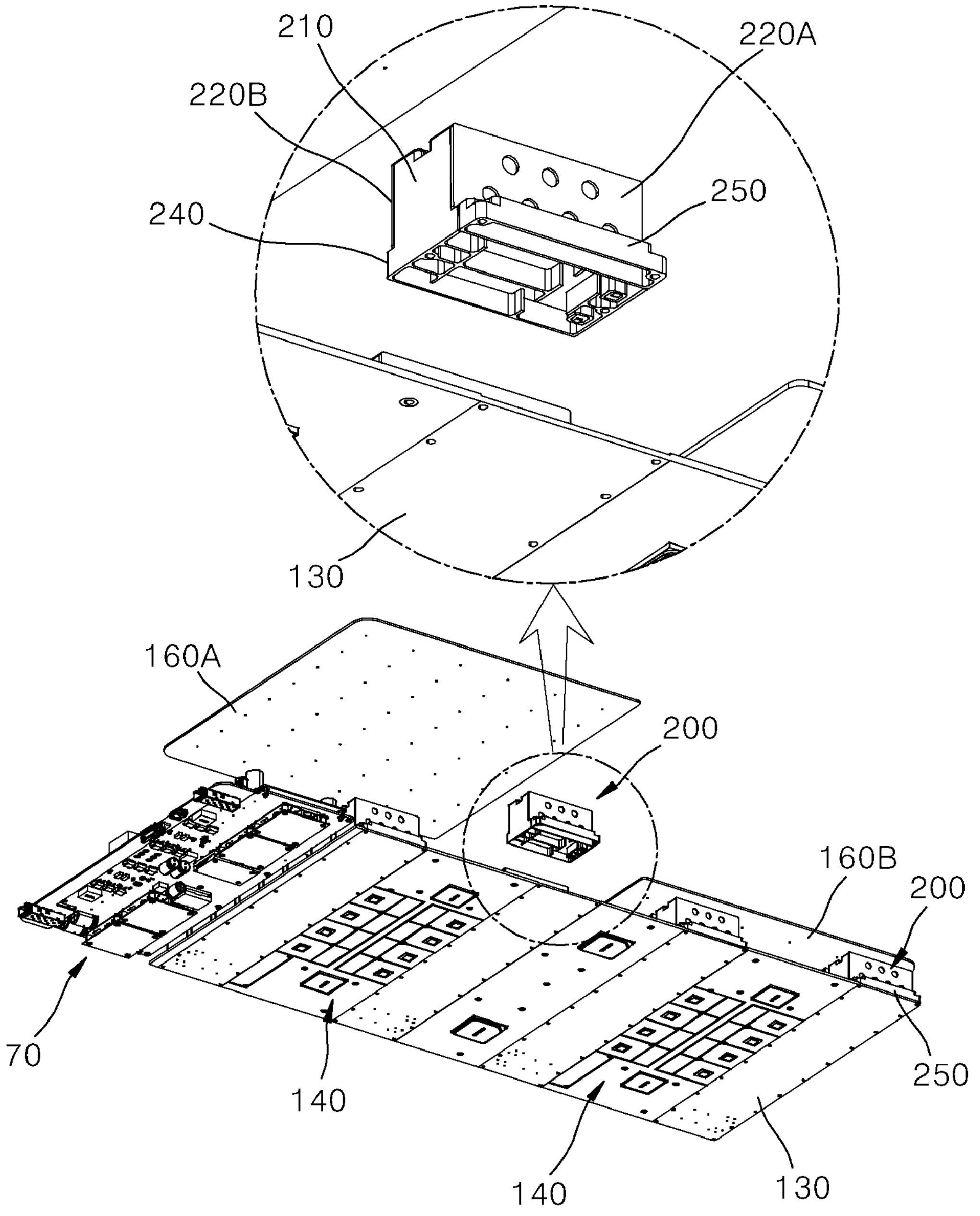
Figure 7:
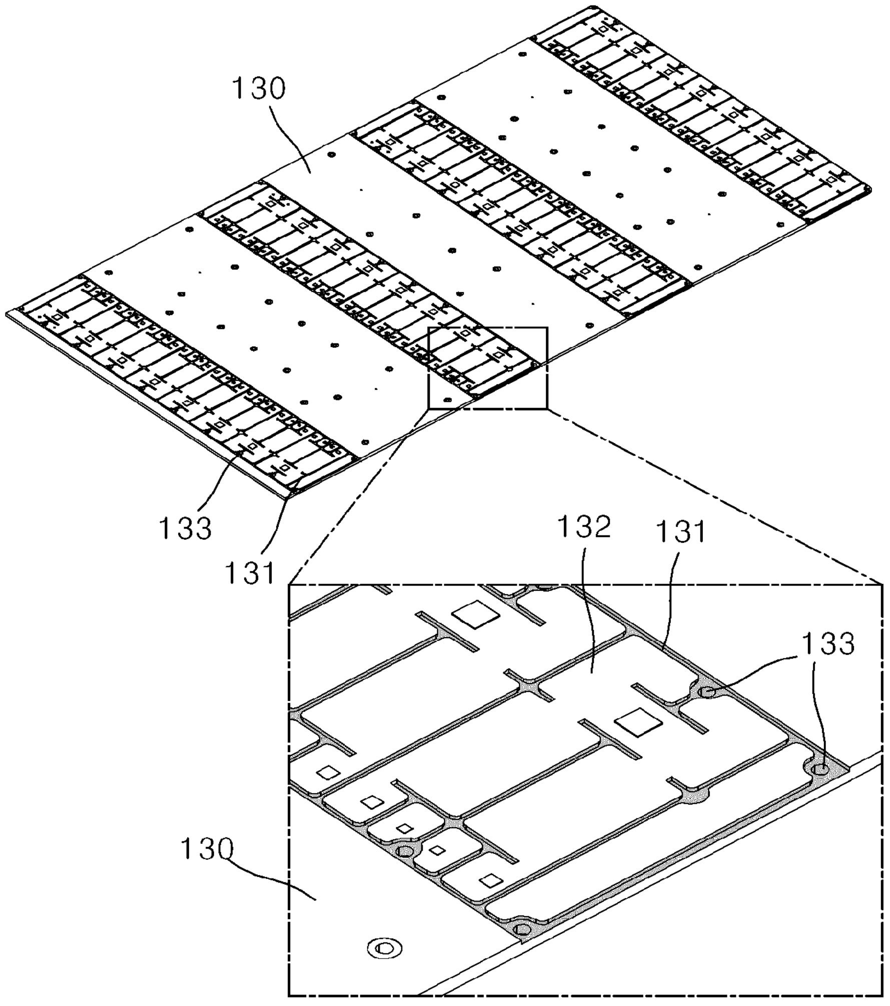
FIG. 7 is a perspective view and a partial enlarged view illustrating one surface of a PBA among the constitutions of an antenna device according to an embodiment of the present disclosure.
Figure 8:
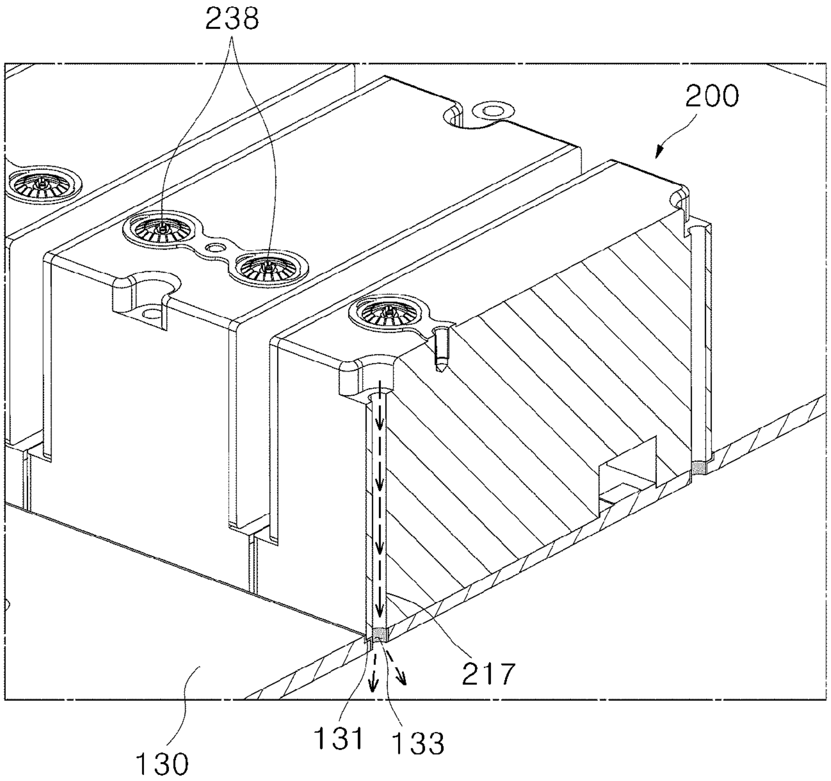
FIG. 8 is a partial cutaway perspective view of a filter installed on one surface of the PBA of FIG. 7.
Figure 10A:
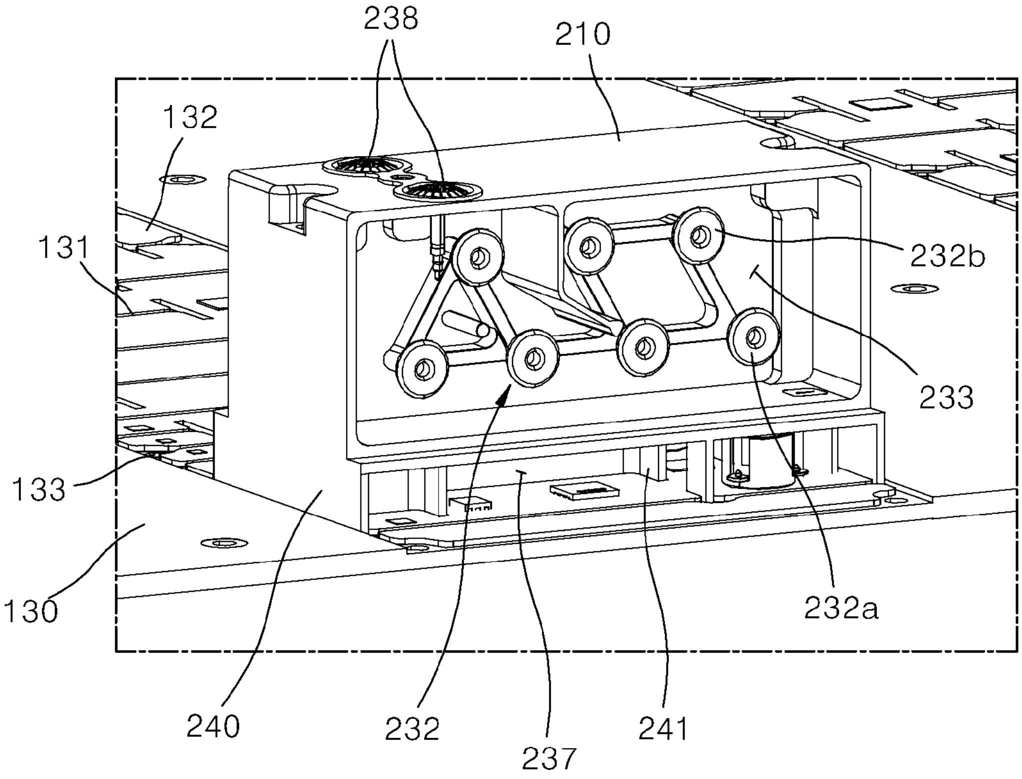
FIGS. 10A and 10B are perspective views illustrating one side surface and the other side surface of the filter of FIG. 9 in more detail.
Figure 10B:
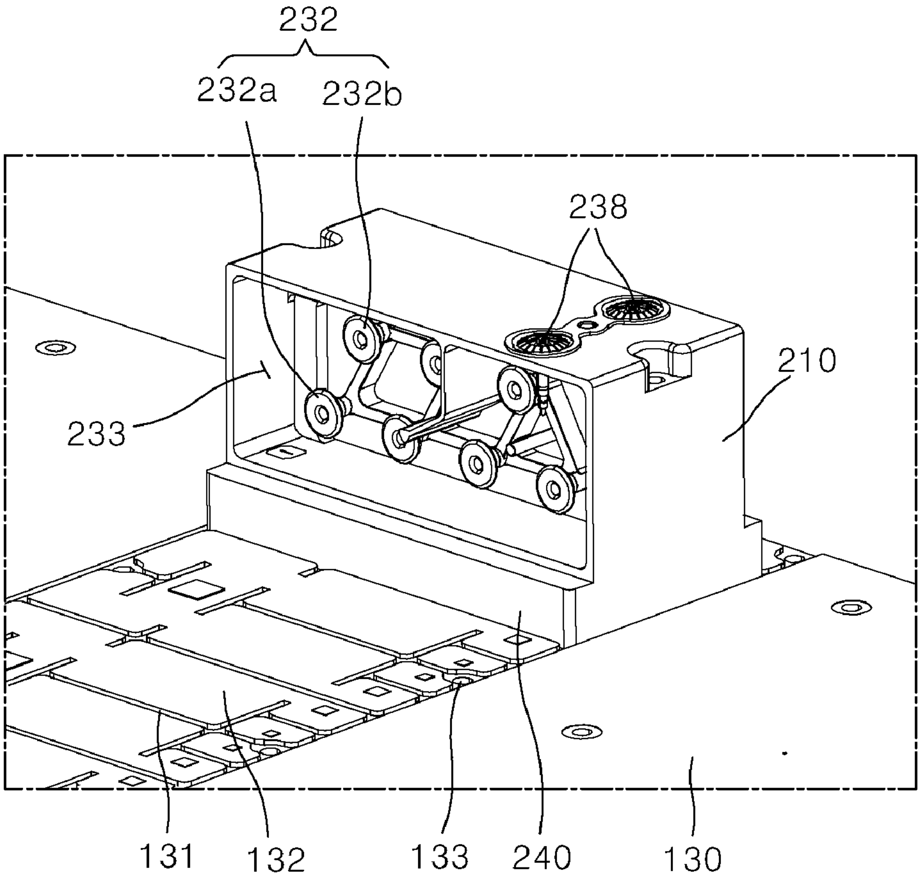

FIGS. 6A and 6B are partial exploded perspective views of FIG. 3, and are downward and upward exploded perspective views, and FIG. 7 is a perspective view and a partial enlarged view illustrating one surface of a PBA among the constitutions of an antenna device according to an embodiment of the present disclosure. FIG. 8 is a partial cutaway perspective view of a filter installed on one surface of the PBA of FIG. 7. FIG. 9 is a perspective view and a partial enlarged view illustrating a stacked appearance of a filter and a side support for a location setting groove formed on one surface of the PBA of FIG. 7, and FIGS. 10A and 10B are perspective views illustrating one side surface and the other side surface of the filter of FIG. 9 in more detail.

As illustrated in FIGS. 6A to 7, a clamshell seating groove 131, into which an end part 241 of the clamshell part 240 is inserted, may be formed on the other surface of the PBA through intaglio processing in a groove shape.

Here, it is preferable that the clamshell seating groove 131 is formed on the other surface of the PBA 130 through the intaglio processing in a shape corresponding to the shape of the end part 241 of the clamshell part 240 so that the front end of the clamshell part 240 is inserted into and comes in contact with the clamshell seating groove.

The reason why the other surface of the PBA 130 is formed through the intaglio processing as described above is to minimize the length in a thickness direction of the heat transfer bridge hole 133 that performs the core role in conducting the heat of the cavity 233 being generated by the driving of the filter 200 toward the PBA 130 via the clamshell part 240 made of a thermal conductive material. That is, since the clamshell seating groove 131 is formed on the other surface of the PBA 130 through the intaglio processing, the thermal conductivity length can be reduced through the reduction of the overall thickness of the PBA 130 as much as the depth of the clamshell seating groove 131.

Here, since the clamshell seating groove 131 is provided so that the end part 241 of the clamshell part 240 that is integrally formed with the filter main body 210 of the filter 200 is inserted therein, it may simultaneously serve to set the installation location of the individual filters 200. Accordingly, the assembly time can be greatly reduced during mounting assembly for the other surface of the PBA 130 of the filter 200.

More specifically, the clamshell seating groove 131 may be formed to have a "⊏"-shaped cross section so that the front end surface of the clamshell part 240 is seated therein, and the clamshell seating groove 131 comes in contact with a part of the side surface part that is adjacent to the front end surface of the clamshell part 240.

It is preferable that the width of the clamshell seating groove 131 is set to be larger than the thickness of the one end part of the clamshell part 240 so that at least a part of the one end part of the clamshell part 240 is inserted therein, and the clamshell seating groove 131 is formed with a size that does not completely penetrate the PBA 130.

Meanwhile, a heat transfer bridge hole 133 for transferring heat transferred from the clamshell part 240 from the other surface side of the PBA 130 toward one surface side (i.e., lower surface side in the drawing) may be formed on the PBA 130. The heat transfer bridge hole 133 may be formed to completely penetrate the one surface and the other surface of the PBA 130.

Here, it is preferable that the heat transfer bridge hole 133 is formed to penetrate the PBA 130 in a plurality of places on the bottom surface of the clamshell seating groove 131. That is, as described above, the heat transfer bridge hole 133 serves to transfer the heat generated from the cavity 233 of the filter main body 210 of the filter 200 toward the one surface of the PBA 130 via the clamshell part 240, and it is good for heat transfer that the heat transfer bridge hole 133 is formed in a location where the thickness of the PBA 130 is minimized. Accordingly, it is preferable that the heat transfer bridge hole 133 is formed within the bottom surface of the clamshell seating groove 131 that is formed in advance through the intaglio pressing in a direction in which the thickness of the PBA 130 is reduced.

In addition, a thermal conductive material may be plated and formed on the clamshell seating groove 131, the heat transfer bridge hole 133, and the one surface of the PBA 130.

In general, the PCB including the PBA 130 is made of an FR4 material, and is made of a material having a low thermal conductivity or a non-conductive material. Accordingly, the PBA 130 itself is not suitable for thermal conductivity, and thus it is preferable that the thermal conductive material is plated and formed on the whole surface on which the clamshell seating groove 131 that is a region coming in contact with the end part 241 of the clamshell part 240 is formed.

Further, the thermal conductive material may be coated even on the whole inner surface of the heat transfer bridge hole 133 so that the heat transferred to the clamshell seating groove 131 is transferred to the one surface of the PBA 130 through the heat transfer bridge hole 133 without interruption.

More improved heat dissipation effects can be achieved by forming a heat transfer path that is formed by plating the thermal conductive material on the whole inner periphery of the heat transfer bridge hole 133 and at least a part of the one surface of the PBA 130 so that the heat is easily transferred from the end part 241 of the clamshell part 240 inserted into the clamshell seating groove 131 that is the region corresponding to the other surface of the PBA 130, and then penetrates the one surface and the other surface of the PBA 130.

As described above, the clamshell part 240 that is inserted into the clamshell seating groove 131 formed on the other surface of the PBA 130 may extend from the one end of the filter main body 210, and may be fixed to the other surface of the PBA 130.

In addition, as illustrated in FIG. 8, a thermo-fluidic hole 217 may be formed on one end part and the other end part in a length direction of the filter main body 210 of the filter 200 to penetrate the filter main body 210.

Since the thermo-fluidic hole 217 is formed to match the heat transfer bridge hole 133 so that air on the side of the other surface of the PBA 130 can pass through the one surface side of the PBA 130, it can discharge not only the heat generated by the filter 200 itself but also the high-temperature air on the other surface side of the PBA 130 toward the one surface of the PBA 130.

Meanwhile, on the other surface of the filter main body 210 of the filter 200, as illustrated in FIG. 10A, at least one RF connector 238 that is connected to one surface (lower surface in the drawing) of the antenna boards 160A and 160B may be further included.

When the antenna board 160 that is secondarily stacked comes in close contact with the RF connector 238, the RF connector serves not only to absorb the assembly tolerance between the antenna board 160 and the PBA 130 but also to construct a specific signal line.

As illustrated in FIG. 9, the filters 200 having the above-described constitution may be fixed to the plurality of clamshell seating grooves 131 formed in advance on the other surface of the PBA 130 in various methods including a soldering method after being sequentially seated on the clamshell seating grooves 131.

In this case, since the plurality of clamshell seating grooves 131 are formed corresponding to the shape of the one end part 241 of the clamshell part 240 integrally formed with the one end part of the individual filters 200, they can perform the location setting function during assembly, and thus the assembly time can be reduced.

Further, as illustrated in FIGS. 10A and 10B, since the heat generated from the cavities 233 partitioned by the partitions 239 is transferred to the clamshell seating grooves 131 via the clamshell part 240, and then is easily discharged to the one surface side of the PBA 130 through the heat transfer bridge hole 133, the heat dissipation performance can be greatly improved.

In particular, the inventors of the present disclosure drove the antenna device according to an embodiment of the present disclosure by applying the heat transfer bridge hole 133 under the same thermal conductivity condition (k=10 W/mk) through selection of the separation type structure already described in "Background Art" with reference to FIGS. 1 and 2 as a comparative example. As a result, in case of the comparative example, the temperature of a specific heat generation component (main TR module) was further improved to a minimum of 4.0° C. to a maximum of 5.8° C., whereas in case of an embodiment of the present disclosure, the temperature of the specific heat generation component (main TR module) showed further improved characteristics of a minimum of 4.5° C. to a maximum of 6.9° C.

It is interpreted that according to the antenna device according to an embodiment of the present disclosure, the contact thermal resistance is reduced as compared with the separation type structure, and the heat condensed on the other surface side of the PBA 130 corresponding to the side of the clamshell part 240 through the heat transfer bridge hole 133 can be effectively transferred and dissipated to the one surface side of the PBA 130 via the heat transfer bridge hole 133.

Figure 11A:
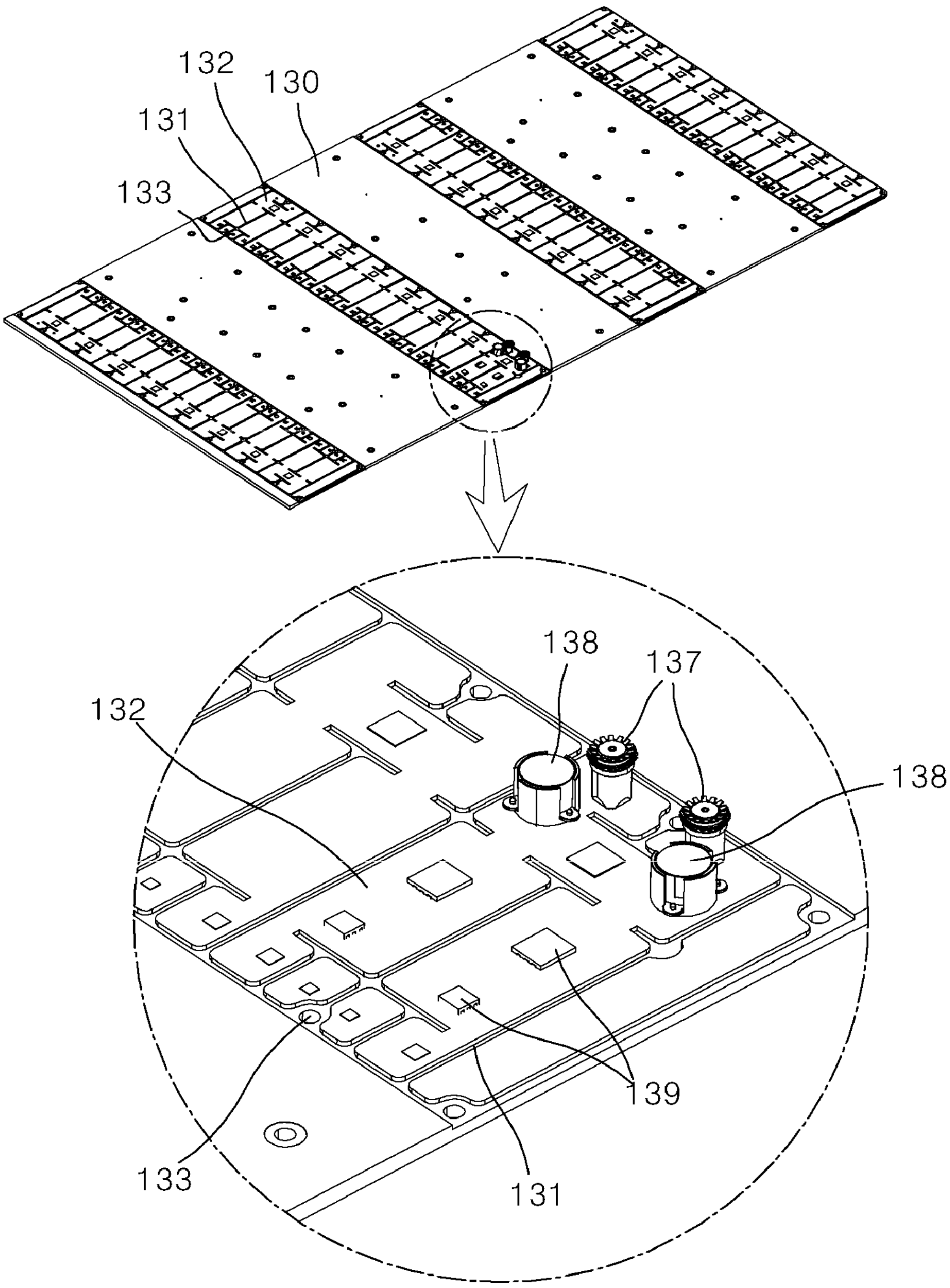
FIGS. 11A to 11C are an assembly view and an enlarged view thereof explaining an installation process of a filter against one surface of a PBA.
Figure 11B:
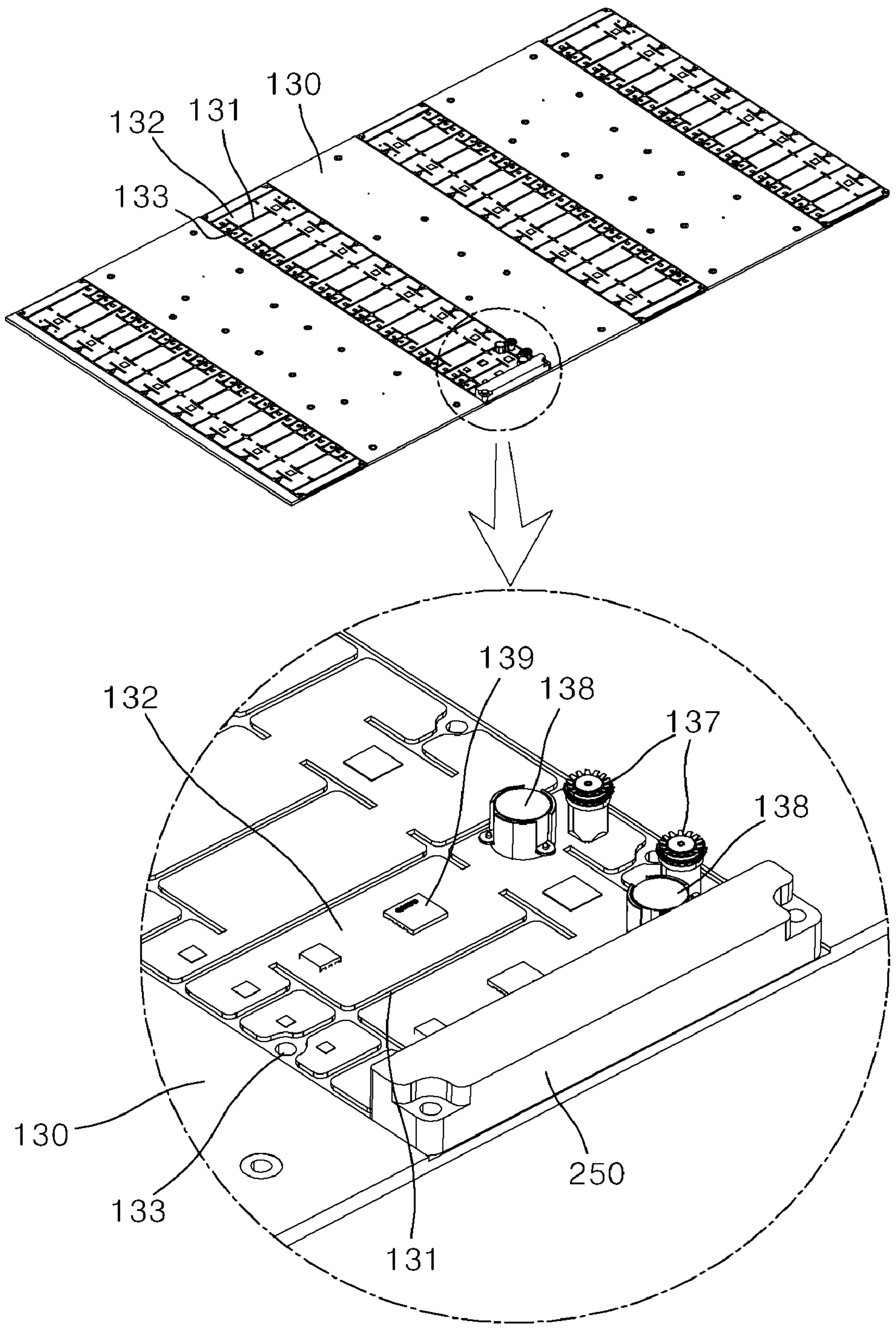
Figure 11C:
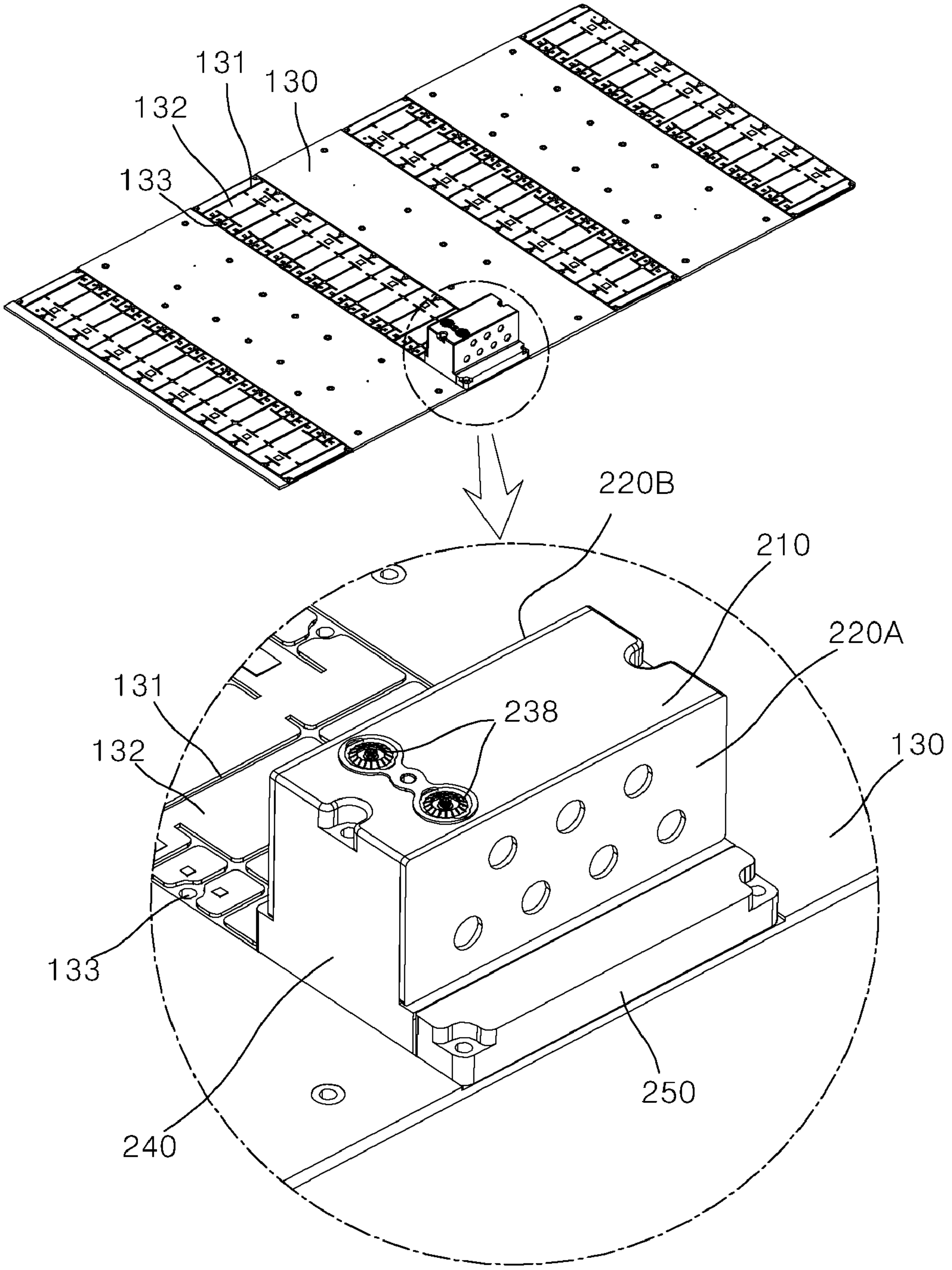

FIGS. 11A to 11C are an assembly view and an enlarged view thereof explaining an installation process of a filter against one surface of a PBA.

An assembly process of an antenna device according to an embodiment of the present disclosure constituted as above will be briefly described with reference to the accompanying drawings (particularly, FIGS. 11A to 11C).

First, after other electronic components 137, 138, and 139 are mounted on an inner plane 132 of the clamshell seating groove 131 formed on the other surface side of the PBA 130 as illustrated in FIG. 11A, the side supporter 250 that is fixed to the left or right end part of the PBA 130 to support the clamshell part 240 is put and fixed to the inner side of the pre-formed clamshell seating groove 131. However, it is not always necessary that the side supporter 250 is installed on the other surface of the PBA 130 before the filter main body 210 is fixed, but it is also possible to install the side supporter 250 after the filter main body 210 is fixed.

Next, as illustrated in FIG. 11C, the filter 200 is fixed by inserting the end part 241 of the clamshell part 240 integrally formed with the filter main body 210 into the clamshell seating groove 131 formed on the other surface of the PBA 130.

The heat generated in the cavity 233 inside the filter main body 210 during electrical driving of the filter 200 may be transferred to the one surface side of the main housing 10 through the clamshell seating groove 131 and the heat transfer bridge hole 133 via the clamshell part 240 made of the thermal conductive material, and then may easily dissipated to the outside through the plurality of heat dissipation pins 15 integrally formed with the one surface of the main housing 10 provided to directly come in thermal contact with the one surface of the PBA 130.

As described above, the antenna device according to an embodiment of the present disclosure has the advantages that the heat generation is minimized by stacking and disposing a plurality of resonance components 232 provided inside the cavity 233 of the filter main body 210 in a thickness direction between the PBA 130 and the antenna boards 160A and 160B, and the heat dissipation performance can be greatly improved by easily transferring the heat to the one surface side of the PBA 130 through the clamshell part 240 integrally formed with the filter main body 210.

As above, an antenna device according to an embodiment of the present disclosure has been described in detail. However, embodiments of the present disclosure are not necessarily limited to the above-described embodiment, but it will be apparent that various modifications and implementation within an equal scope are possible by those of ordinary skill in the art to which the present disclosure pertains. Accordingly, the true scope of the present disclosure should be interpreted by the appended claims.

INDUSTRIAL APPLICABILITY

The present disclosure provides an antenna device which can minimize thermal contact resistance by integrally forming a filter and a clamshell, and thus can maximize the heat dissipation performance.

The invention claimed is:

1. An antenna device comprising:

a printed board assembly ("PBA") having one surface on which a plurality of antenna-related components are mounted and the other surface on which a plurality of filters are mounted; and an antenna board disposed to be stacked on one surface side of the PBA, mounted with a plurality of antenna elements on one surface of the antenna board, and connected to construct electrical signal lines with the plurality of filters in close contact with the other surface of the antenna board, wherein the plurality of filters are spaced apart from the other surface of the PBA, and is integrally formed with a clamshell part configured to prevent a signal from leaking from the electrical signal lines.

2. The antenna device of claim 1, wherein a clamshell seating groove, into which an end part of the clamshell part is inserted, is formed on the other surface of the PBA through intaglio processing in a groove shape.

3. The antenna device of claim 2, wherein a heat transfer bridge hole for transferring heat transferred from the clamshell part toward one surface side is formed on the PBA.

4. The antenna device of claim 3, wherein a thermal conductive material is plated and formed on the clamshell seating groove, the heat transfer bridge hole, and the one surface of the PBA.

5. The antenna device of claim 3, wherein the heat transfer bridge hole is formed in a plurality of places of the clamshell seating groove.

6. The antenna device of claim 3, wherein the heat transfer bridge hole is formed to penetrate the PBA.

7. The antenna device of claim 5, wherein the clamshell seating groove is formed in a shape corresponding to a shape of an end part of the clamshell part so that all end parts of the clamshell part come in contact with the clamshell seating groove.

8. The antenna device of claim 5, wherein the clamshell seating groove is formed to have a "⊂"-shaped cross section so that a front end surface of the clamshell part is seated therein and the clamshell seating groove comes in contact with a part of a side surface part that is adjacent to the front end surface of the clamshell part.

9. The antenna device of claim 1, wherein the plurality of filters are provided in a manner that at least one cavity is separately provided by a partition, and at least two resonance components provided to project from the partition into the at least one cavity is disposed to be stacked so as to form different layers to a PBA side and an antenna board side.

10. The antenna device of claim 9, wherein at least one of the plurality of filters comprises:

two filter main bodies formed left and right around the partition; and a left shielding panel configured to shield an open left side of the at least one cavity and a right shielding panel configured to shield an open right side of the at least one cavity, wherein the clamshell part extends from one end part of the filter main body, and is fixed to the other surface of the PBA.

11. The antenna device of claim 10, wherein the at least one of the plurality of filters further comprises at least one RF connector connected to one surface of the antenna board.

12. The antenna device of claim 10, wherein a heat transfer bridge hole for transferring heat transferred from the clamshell part to one surface side is formed on the PBA, wherein a thermo-fluidic hole is further formed on one end part and the other part of a length direction of the filter main body to penetrate the filter main body, and wherein the thermo-fluidic hole is formed to match the heat transfer bridge hole.

13. The antenna device of claim 1, wherein at least two partitioned hollow parts are formed in the clamshell part, wherein a signal input line for inputting a signal toward a cavity of the plurality of filters is provided in one of the hollow parts, and wherein a signal output line for outputting a signal from the cavity side of the plurality of filters is provided in the other of the hollow parts.

* * * * *